June 10, 1930.  G. J. SCHREIER  1,762,276
PIPE INSULATION
Filed April 2, 1928
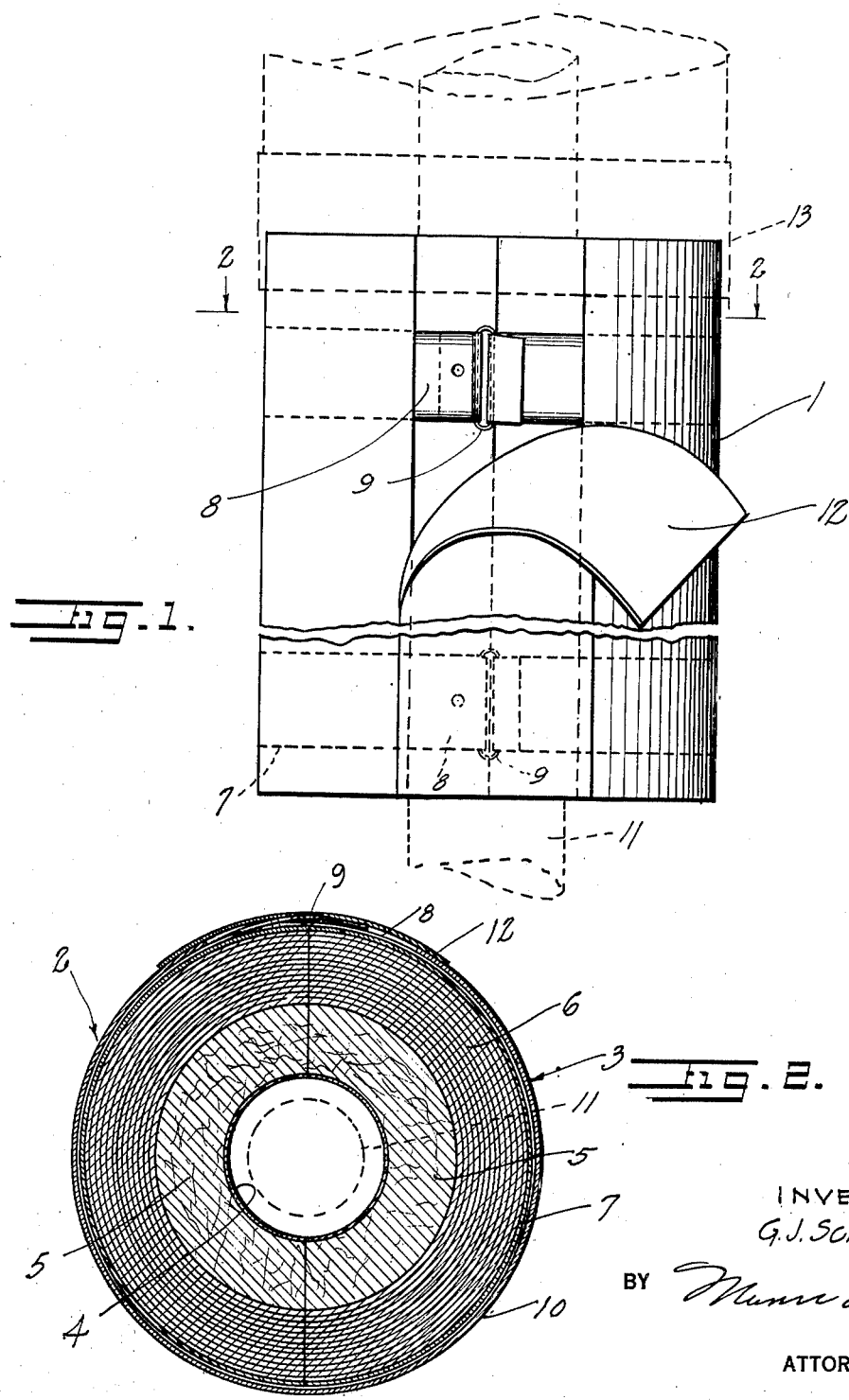
INVENTOR
G.J. SCHREIER
BY
ATTORNEYS Patented June 10, 1930

1,762,276

UNITED STATES PATENT OFFICE

GEORGE J. SCHREIER, OF CHICAGO, ILLINOIS

PIPE INSULATION

Application filed April 2, 1928. Serial No. 266,847.

My invention relates to improvements in pipe insulation, and it consists in the combinations, constructions, and arrangements herein described and claimed.

An object of my invention is to provide a pipe insulation which may be formed by machinery and constructed in sections adapted to be applied to refrigerating pipes or the like. In this manner, the insulation may be formed more accurately at relatively little cost and can be readily applied to the pipes.

A further object of my invention is to provide a device of the type described which has novel means for sealing the various sections and rigidly holding the sections in place, whereby the metal parts will be sealed from the weather and the connections will be made air-tight.

Other objects and advantages will appear in the following specification, and the novel features of the invention will be particularly pointed out in the appended claims.

My invention is illustrated in the accompanying drawings, forming part of this application, in which Figure 1 is a side elevation of one section of the insulation indicating the manner in which it is applied to a pipe, and Figure 2 is a section along the line 2—2 of Figure 1.

In carrying out my invention, I provide a section or body portion 1 which comprises semi-cylindrical portions 2 and 3. The portions 2 and 3 are provided with inner semi-circular casings 4 around which is disposed a relatively thick layer of hair felt 5. A plurality of layers of wool felt 6 are disposed over the layers of hair felt 5. Outer semi-circular casings 7 are disposed over the outermost wool felt layers 6.

In actual construction, the various layers will be wound perhaps upon a spindle or the like and later be cut so as to form semi-cylindrical portions. These portions are connected to each other by flexible metal bands 8 which have eyelets 9 carried by one of their ends. A cover 10 is disposed upon and extends nearly around the semi-cylindrical portions 2 and 3. The ends of the cover terminates a short distance from the connecting portion of the semi-circular members, that is, the portion adjacent the ends of the metal bands 8.

From the foregoing description of the various parts of the device, the operation thereof may be readily understood. The portions 2 and 3 have a suitable sealing solution, such as pitch, tar or the like applied to the connecting surfaces for forming a seal-tight connection when the two halves are moved together. The section 1, as shown in solid lines in Figure 1, may be passed around a pipe indicated at 11, and the semi-cylindrical portions 2 and 3 may be brought together and rigidly secured to the pipe 11 by passing the free ends of the metal bands through the eyelets 9 and drawing the bands taut. Then by bending the free ends of the bands back upon themselves, the portions 2 and 3 are secured to each other and to the pipe 11.

Other sections, such as that indicated in dotted lines in Figure 1, may be disposed upon the pipe 11 in a similar manner. Each of these sections is provided with the sealing solution at their connecting surfaces and also at their ends so that the semi-cylindrical portions of each of the sections will be sealed to each other and the ends of the sections will be secured to the adjacent sections. A sealing strip 12 is then secured to the sections along the joining portions thereof. The sealing strip may be provided with any sealing means for firmly securing the strip to the portions 2 and 3 and cover the metal bands 8 and form a seal-tight connections. A sealing strip 13 may be passed around the sections at the joining ends for forming a seal-tight connection therebetween.

I claim:

A pipe insulation of the character described comprising semi-cylindrical body portions, a circular casing secured to said body portions for hingedly connecting said body portions together, retaining bands disposed upon said casing for securing said body portions in closed positions, a cover for said casing having its ends terminating a short distance from the free edges of said body portions, whereby said securing bands may be covered for their entire length with the exception of the ends adjacent the free ends of said body portions, and a sealing strip disposed over the free ends of said body portions over the ends of said securing bands and over the ends of said cover and firmly secured in place.

Signed at Chicago in the county of Cook and State of Illinois, this 24th day of March, A. D. 1928.

GEORGE J. SCHREIER.